United States Patent Office 3,318,932
Patented May 9, 1967

3,318,932
AMIDOSULFINATES AND PROCESS FOR PREPARING SAME
Walter A. Kornicker, Zurich, Switzerland, assignor to Monsanto Company, a corporation of Delaware
No Drawing. Filed July 2, 1962, Ser. No. 207,010
Claims priority, application Switzerland, July 5, 1961, 7,956/61
11 Claims. (Cl. 260—429)

It is an object of this invention to provide amidosulfinates and methods for preparing same. The amidosulfinates possess the general formula $$A(O_2SNRR')_a(NRR')_b(OR'')_c(X)_d$$

In this formula A signifies a metal atom, silicon atom, phosphorus atom, arsenic atom or boron atom which, for the sake of simplicity, are herein defined by the term "metal" as it is generally used in the metallorganic chemistry. However, A may also be a radical of a metal oxide, ammonium ($NH_4^+$) or substituted ammonium.

The substituent or substituent-part NRR' is either the group $NH_2$ or the radical of a primary or secondary amine. Consequently, R and R' are hydrogen atoms, aliphatic, cycloaliphatic, araliphatic, aromatic or heterocyclic radicals. These may be identical or different. Examples of these radicals are methylamine, dimethylamine, N-methyl-ethylamine, diethylamine, etc.; benzylamine, N-methyl-benzylamine, N-phenyl-benzylamine, etc.; cyclohexylamine, N - methyl-cyclohexylamine, dicyclohexylamine, etc.; aniline, methylaniline, diphenylamine, etc. The adjacent radicals R and R' taken together can form a heterocyclic amine such as, e.g. pyrrolidine, piperidine, morpholine, etc. When the substituent or substituent-part occurs at least twice, these may be linked together by their radical R. In such cases it is a matter of diamines, such as e.g. diaminoalkanes, diaminobenzenes, diaminonaphthalenes, piperazine, etc., or triamines, such as e.g. triaminoalkanes, triaminobenzenes, triaminonaphthalenes, melamine, etc.

It is possible that alkoxyl and amide substituents found together can be linked in a similar manner. In such cases the substituents are derived from aminoalcohols and aminophenols.

In the formula set forth hereinabove the substituent OR'' signifies the radical of a hydroxyl compound and, therefore, R'' is in general a hydrocarbon radical.

In the reactants and products of the invention normally R, R' and R'' each have not more than 18 carbon atoms, more preferably not more than 8 carbon atoms.

X stands for an anion of monobasic acid or a corresponding anion-part of a multibasic acid. In general, X is a halogen atom, preferably a chlorine atom.

While the substituent $RR'NSO_2$ is found in the products of invention at least once, the other substituents further illustrated in the formula set at the beginning, can be absent. In the formula, therefore $a$ is at least 1, while $b$, $c$ and $d$ can be zero or an integer. It is clear that the number of the possible substituents depends on the valence of M, and consequently the sum of $a+b+c+d$ corresponds to the valence of M.

The present invention is based on my discovery that all occurring amides of metals are converted into the corresponding amidosulfinates (thionoamidates) on the treatment with sulfur dioxide ($SO_2$). As metals are principally qualified alkali metals, alkaline earth metals, aluminum, tin, zinc; transistion metals such as titanium, vanadium, etc.; silicon, phosphorus, arsenic and boron. Examples of metal oxide radicals are TiO, ZrO, $Zr_2O_3$, VO, CrO, $CrO_2$, PO, etc.

The principle of the reaction can be represented by the following scheme, wherein M signifies, for example, an alkali metal atom and R and R' are defined as before:

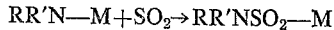

When more than one amide group linked to metal is present in the starting compound—that, of course, is possible only with multivalent metals wherein more than one amidosulfinyl group can be formed on the treatment with sulfur dioxide. In general, with compounds having more than two amide groups and exclusively amide groups or amide and alkoxy groups, side-reactions occur. Tetrakis-(dimethylamido)-titanium gives on treatment with excess sulfur dioxide titanium oxide-bis-dimethylamido-sulfinate together with thionyldimethylamide:

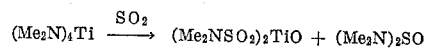

It seems that amidosulfinates having more than two amidosulfinyl groups are unstable.

In many cases the simultaneously appearing reduction activity has to be considered. Thus, the pentavalent tris-(diethylamido)-vanadium oxide, for example, is reduced to the tetravalent bis-(diethylamido)-vanadium oxide on the treatment by sulfur dioxide:

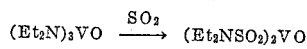

It has already been mentioned that in compounds of multivalent metals, also alkoxyl, aralkoxyl and aroxyl radicals may be found as substituents. These will not be altered by sulfur dioxide under the conditions used herein and will not exert any influence on the course of the reaction.

Residues of acids possibly present will also be preserved in the reaction. However, they can affect the reaction in such a way that amide substituents which are present will, even with excess of sulfur dioxide, only partly be converted to amidosulfinyl groups.

Thus, dimethylamido - chloro - titanium-bis-dimethyl-amidosulfinate is formed from tris-(dimethylamido)-titanium chloride.

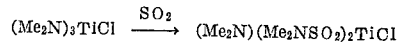

and dimethylamido-dichloro-titanium dimethylamidosulfinate is formed from bis-(dimethylamido)-titanium dichloride

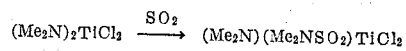

The preparation of the amidosulfinates is effected by conducting sulfur dioxide into a solution of the amide or into an amide which is liquid at the reaction temperature. The reaction is strongly exothermic. A solvent in which the end product is not soluble, but the starting product is, and which is inert towards sulfur dioxide is conveniently used. Suitable solvents are, for example, ether for lithium amides, benzene for titanium and vanadium amides, etc., wherein the resulting amidosulfinates are insoluble. Many end products, such as e.g. dimethylsilicon bis-dimethtylamidosulfinate, can be distilled in vacuum. One works by exclusion of moisture and, if need be, in a nitrogen atmosphere.

Since the metal-oxygen bond formed by the reaction is hydrolytically more stable than the original metal-nitrogen bond, amides such as, e.g., tin amides which, as a rule, are only hardly or not separable, can also be reacted according to the novel method. The resulting amidosulfinates, then, are more stable.

It is clear, that by reacting of relatively easily available alkali amidosulfinates with halides of other metals, optional metal amidosulfinates can be prepared. This double reaction also allows the preparation of salts of ammonia and other organic bases.

For this purpose, such solvents which are capable of dissolving alkali amidosulfinates are conveniently used. Especially suited are organic sulfones and sulfoxides, pyrridine, etc. According to the stoichiometric ratio of the reactants one obtains compound which still contain halogen:

$$SiCl_4 + nLiO_2SNMe_2 \rightarrow Si(O_2SNMe_2)_nCl_{4-n} + nLiCl$$

Another method useful in the preparation of alkali and ammonium amidosulfinates, resides in the neutralization of aqueous solutions of amidosulfinic acids by alkali hydroxides or ammonia. Because of the instability of the free amidosulfinic acids, especially aromatic amidosulfinic acids, in aqueous solution, it is often advantageous to prepare the salts in the absence of water. For this purpose, the anhydrous amidosulfinic acids obtainable from ammonia or amines and sulfur dioxide are converted into the corresponding salts by treating with alkali or alkaline earth metals. The amidosulfinic acid is reacted with a calculated amount of the finely dispersed metal and, if necessary, the mixture is heated until no more hydrogen is evolved. However, such formation of salts can also be achieved by using alkali hydrides or alkali amides by methods known per se. Another object of this invention is the use of the formulated amidosulfinates as biologically active means, especially pesticides, such as insecticides.

EXAMPLE 1

*Lithium diethylamidosulfinate* $(C_2H_5)_2NSO_2Li$

From n-butyllithium (free of lithium chloride) and anhydrous diethylamine there are prepared 3.0 g. (0.038 mole) of lithium diethylamide in hexane. The solid product is dried in vacuum and dissolved in 50 ml. of anhydrous diethylether. Dry sulfur dioxide is passed into the ether solution at room temperature. An exothermic reaction occurs. After about 15 minutes, a white amorphous product separates in the solution. The reaction product is kept under an $SO_2$-atmosphere for 10 hours and then filtered off. The solid product is washed with ether and dried in high vacuum. There are obtained 4.4 g. (81% of the theory) of a white powder.

*Analysis.*—$C_4H_{10}NSO_2Li$ (143.1).

A sample of 0.220 g. of the compound consumes 31.05 ml. of 0.1 n-iodine solution (calculated 31.40 ml.).

EXAMPLE 2

*Titanium oxide bis-dimethylamidosulfinate* $[(CH_3)_2NSO_2]_2TiO$

Titanium tetra-dimethylamide is dissolved in anhydrous benzene and an excess of sulfur dioxide is fed in. The reaction is strongly exothermic. The yellow solution is temporarily dark-red and then yellow again. A white solid compound separates. Yield 80%. The novel compound possesses according to the analysis the formula illustrated above. It decomposes at about 130° C. The product acts as a contact insecticide as will be seen from the following explanations:

Adults of plum curculio (*Conotrachelus nenuphar*, Hbst) are anesthetized with carbon dioxide and the 1 microliter of a solution containing 0.1 microgram titanium oxide bis-dimethylamidosulfinate in acetone is placed on the under side of abdomen. A topical applicator fitted with a 0.25 cc. syringe which is able to deliver one microliter of solution is used for this purpose.

Three plum curculios each are set together with a small slice of apple into plastic tubes (5 x 1.9 cm.), stoppered at each end with a sifter cap and held at room temperature for 48 hours.

After this time a 100% kill is observed, while the control-insects are still living.

*Analysis.*—$C_4H_{12}O_5N_2S_2Ti$. Calcd: N, 10.00%; S, 22.9%; Ti, 17.1%. Found: N, 10.14%; S, 20.7%; Ti, 16.8%.

EXAMPLE 3

*Dimethylamido-dichloro-titanium dimethylamidosulfinate* $(CH_3)_2NTi[O_2SN(CH_3)_2]Cl_2$ Bis-(dimethylamido)-titanium dichloride is dissolved in anhydrous benzene and an excess of sulfur dioxide is injected. The reaction is strongly exothermic. A red oil accumulates on the bottom of the reaction vessel. The substance is transformed into a dark-brown solid on drying. Yield 75%. The novel compound possesses according to the analysis the formula illustrated above and melts at about 120–125° C.

The product acts as a contact insecticide and feed insecticide. The latter becomes apparent from the following explanations:

The same applicator and the same solution is used as in Example 2. Lima bean leaf discs of 7 mm. in diameter are punched and placed on moist blotter paper within a plastic box. One microliter of a solution containing 0.1 microgram of dimethylamido-dichloro-titanium dimethylamidosulfinate in acetone is applied to each disc by means of the topical applicator. After the solvent is evaporated, a second instar southern armyworm larva (*Prodenia eridania*, Cram) is encaged with each leaf disc by using a black plastic cap of 2 cm. in diameter. (The leaf disc is small enough to permit complete consumption by the larva.) After a 48-hour holding period at room temperature, a 100% kill is observed, while the control-larvae are still living.

EXAMPLE 4

*Dimethylamido-chloro-titanium bis-dimethylamidosulfinate* $(CH_3)_2NTi[O_2SN(CH_3)_2]_2Cl$ Tris-(dimethylamido)-titanium chloride is dissolved in anhydrous benzene and an excess of sulfur dioxide is injected. The reaction is strongly exothermic. The yellow solution becomes temporarily dark-red and then yellow again. A brownish colored solid compound separates. Yield 85%. The novel compound possesses according to the analysis the formula illustrated above and decomposes at about 150° C.

*Analysis.*—$C_6H_{18}O_4N_3S_2ClTi$. Calc'd: N, 12.23%; Cl, 10.32%. Found: N, 11.2%; Cl, 10.26%.

EXAMPLE 5

*Vanadium oxide bis-diethylamidosulfinate* $[(C_2H_5)_2NSO_2]_2VO$

Tris-(diethylamido)-vanadium oxide is dissolved in anhydrous benzene and an excess of sulfur dioxide is injected. The reaction is strongly exothermic. The dark-green colored solution becomes olive-green and a black solid compound precipitates. Yield 100%. The novel compound possesses according to the analysis the formula illustrated above and melts at 85° C.

*Analysis.*—$C_8H_{20}O_5N_2S_2V$. Calc'd: N, 8.26%; V, 15.01%. Found: N, 8.55%; V, 14.53%.

EXAMPLE 6

*Trimethylsilicon diethylamidosulfinate* $(CH_3)_3SiSO_2N(C_2H_5)_2$

Into 10 g. of colorless trimethylsilicon diethylamide is passed an excess of sulfur dioxide at 0° C. The brown reaction product is distilled in high vacuum. Yield 6.3 g., colorless liquid (=44% of the theory); B.P. 44–47° C./$10^{-3}$ mm.

*Analysis.*—$C_7H_{19}O_2NSSi$ (210.1).

A sample of 608.7 mg. of the compound consumes 57.2 ml. of 0.1 n-iodine solution (calculated 58.0 ml.).

What is claimed is:

1. A process for preparing amidosulfinates of the formula $A(O_2SNRR')_a(NRR')_b(OR'')_c(X)_d$ wherein A is selected from the class consisting of alkali metals, alkaline earth metals, aluminum, tin, zinc, titanium, vanadium, silicon, phosphorus, arsenic, boron, TiO, ZrO, $Zr_2O_3$, VO, CrO, $CrO_2$ and PO, R, R' and R'' are alkyl radicals having not more than 8 carbon atoms, X is a halogen atom, $a$ is an integer, $b$, $c$ and $d$ are selected from the class consisting of zero and integers, and $a+b+c+d$ equal the valence of A, comprising reacting a compound of the formula $A(NRR')_{a+b}(OR'')_c(X)_d$ wherein A, R, R', R'', X, $a$, $b$, $c$ and $d$ are as defined hereinabove, with sulfur dioxide.

2. A process of claim 1 wherein X is chlorine and $c$ is zero.

3. A process of claim 1 carried out in an inert solvent.

4. An amidosulfinate of the formula

wherein A is selected from the class consisting of alkali metals, alkaline earth metals, aluminum, tin, zinc, titanium, vanadium, silicon, phosphorus, arsenic, boron, TiO, ZrO, $Zr_2O_3$, VO, CrO, $CrO_2$ and PO, R, R' and R'' are alkyl radicals having not more than 8 carbon atoms, X is a halogen atom, $a$ is an integer, $b$, $c$ and $d$ are selected from the class consisting of zero and integers, and $a+b+c+d$ equal the valence of A.

5. An amidosulfinate of claim 4 wherein X is the chlorine atom and $c$ equals zero.

6. Lithium diethylamidosulfinate.

7. Titanium oxide bis-dimethylamidosulfinate.

8. Dimethylamido - dichloro - titanium dimethylamidosulfinate.

9. Dimethylamido-chloro-titanium bis-dimethylamidosulfinate.

10. Vanadium oxide bis-diethylamidosulfinate.

11. Trimethylsilicon diethylamidosulfinate.

No references cited.

TOBIAS E. LEVOW, *Primary Examiner.*

ABRAHAM H. WINKELSTEIN, *Examiner.*

W. J. VAN BALEN, A. P. DEMERS,
*Assistant Examiners.*